United States Patent [19]
Jones

[11] Patent Number: 5,911,038
[45] Date of Patent: Jun. 8, 1999

[54] HIGH AVAILABILITY TELECOMMUNICATIONS SYSTEM WITH A DUAL INTERFACE FOR MIRRORED ASYNCHRONOUS PROCESSING

[75] Inventor: Keith Patrick Jones, Coventry, United Kingdom

[73] Assignee: GPT Limited, United Kingdom

[21] Appl. No.: 08/814,444

[22] Filed: Feb. 10, 1997

Related U.S. Application Data

[63] Continuation of application No. 08/284,822, Aug. 2, 1994, abandoned.

[30] Foreign Application Priority Data

Aug. 3, 1993 [GB] United Kingdom ................ 9317436.5

[51] Int. Cl.$^6$ ........................................................ H04J 3/12
[52] U.S. Cl. .................... 395/180; 395/840; 395/183.17; 395/183.19; 395/285
[58] Field of Search ..................................... 395/969, 285, 395/831, 840, 180, 183.19, 183.17

[56] References Cited

U.S. PATENT DOCUMENTS

| | | | |
|---|---|---|---|
| 4,209,840 | 6/1980 | Berardi et al. | 364/200.55 |
| 4,615,017 | 9/1986 | Finlay et al. | 395/551 |
| 4,688,211 | 8/1987 | Van Simaeys et al. | 370/58 |
| 4,720,784 | 1/1988 | Radhakrishnan et al. | 395/287 |
| 4,748,618 | 5/1988 | Brown et al. | 370/419 |
| 5,218,690 | 6/1993 | Boioli et al. | 395/500 |
| 5,301,273 | 4/1994 | Konishi | 395/200.75 |
| 5,384,840 | 1/1995 | Blatchford et al. | 379/229 |
| 5,386,517 | 1/1995 | Sheth et al. | 395/880 |
| 5,414,707 | 5/1995 | Johnston et al. | 370/395 |
| 5,434,722 | 7/1995 | Bizjak et al. | 360/69 |
| 5,537,533 | 7/1996 | Staheli et al. | 395/182.03 |
| 5,617,422 | 4/1997 | Litzenberger et al. | 370/401 |

FOREIGN PATENT DOCUMENTS

| | | |
|---|---|---|
| 1 241 363 | 8/1971 | United Kingdom . |
| 1 582 824 | 1/1981 | United Kingdom . |

OTHER PUBLICATIONS

Larry L. Peterson, "A Yellow–Pages Service for a Local–Area Network", Computer Communications Review, pp. 235–242, 1988.

Larry L. Peterson, "A Yellow–Pages Service for Local Area Network", Computer Communications Review, pp. 235–242, Dec. 1988.

*Primary Examiner*—Paul V. Kulik
*Assistant Examiner*—Grem L. Robinson
*Attorney, Agent, or Firm*—Kirschstein et al.

[57] ABSTRACT

A telecommunications system is required by a system operator to have a high availability, especially in so far as central processing is concerned, as failure of this can render a significant portion of the system inoperative. A telecommunications system has connected to an interface at least two remotely attached computing platforms, each computing platform being arranged to receive, process and provide a response to each functional request from the interface, the system responding to the first response received from the computing platforms. The computing platforms may provide high availability, while themselves being low availability devices.

7 Claims, 1 Drawing Sheet

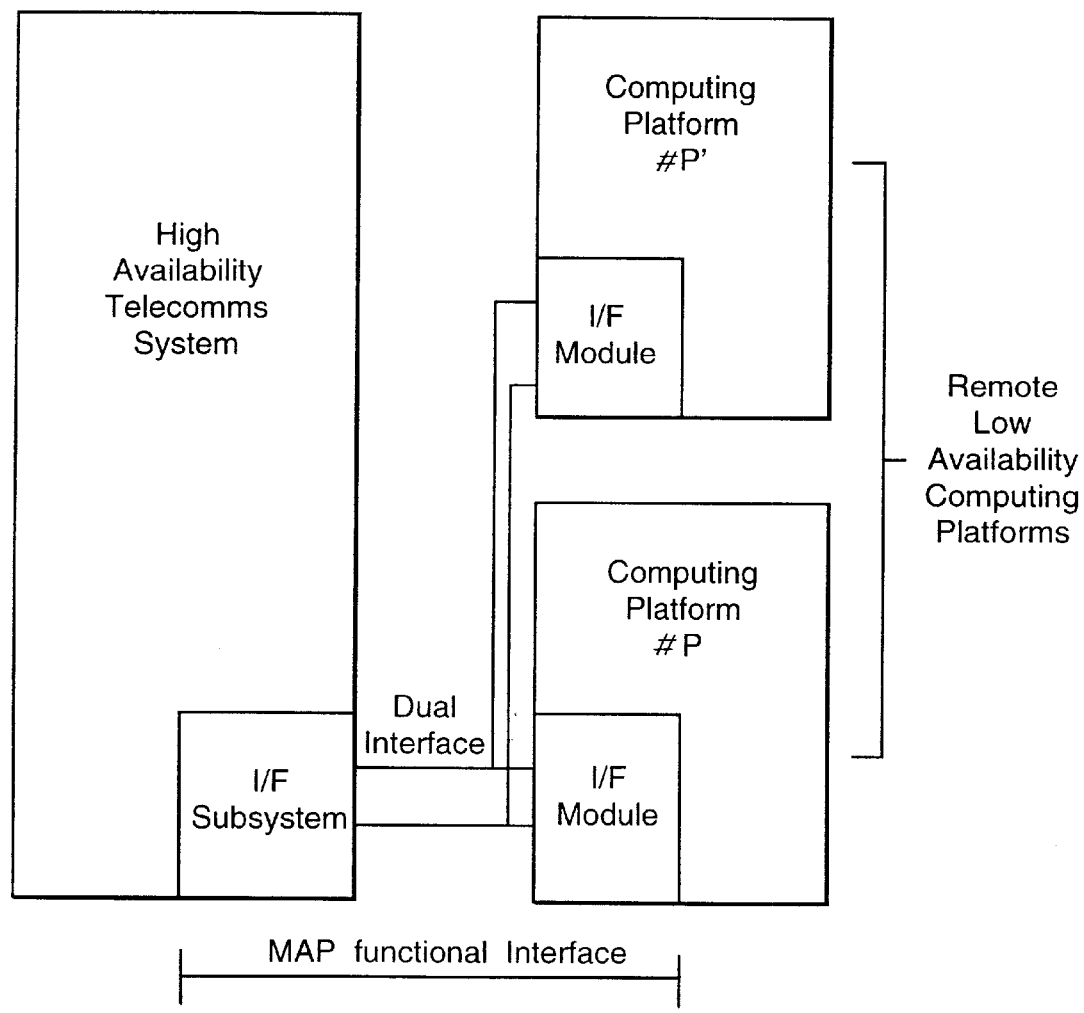

5,911,038

HIGH AVAILABILITY TELECOMMUNICATIONS SYSTEM WITH A DUAL INTERFACE FOR MIRRORED ASYNCHRONOUS PROCESSING

CROSS-REFERENCE TO RELATED APPLICATION

This is a continuation under 37 CFR §1.62 of U.S. patent application Ser. No. 08/284,822, filed Aug. 2, 1994, now abandoned.

BACKGROUND OF THE INVENTION

A telecommunications system is required by the system operator to have a high availability, especially in so far as the central processing is concerned, as failure of this can render a significant portion of the system inoperative.

SUMMARY OF THE INVENTION

According to the present invention there is provided a telecommunications system having connected to an interface thereof at least two remotely attached computing platforms, each computing platform being arranged to receive, process and provide a response to each functional request from the system interface, wherein the system responds to the first response received from the computing platforms.

Preferably, the computing platforms are low availability platforms.

BRIEF DESCRIPTION OF THE DRAWINGS

The present invention will now be described, by way of example, with reference to the accompanying single FIGURE in which is shown a possible minimum configuration for Mirrored Asynchronous Processing (MAP).

DESCRIPTION OF THE PREFERRED EMBODIMENT

In a telecommunications system having additional adjunct or remote processing the high availability of the system is maintained by mirroring the functional interface requests and discarding the redundant responses.

Currently most of the telecommunications systems manufactured are of the stored program control (SPC) type, i.e. they feature a central processing unit (CPU). The trend with the Intelligent Network concept is to move the processing of services to the center of a telecommunications network.

Mirrored Asynchronous Processing (MAP) is a functional protocol which allows telecommunications processing to be centralized onto a plurality of standard and hence potentially cheap, computing industry platforms, which individually may exhibit a relatively low availability, whilst retaining the telecommunications system high availability.

Of course where high availability computing platforms are used the system availability can be increased dramatically, which is advantageous for example for applications where a high level of security is necessary.

The computing platforms may be located locally and accessed via a Local Area Network (LAN), or remotely and accessed via a Wide Area Network (WAN). Irrespective of the actual physical interface the MAP functional interface requires that the use of a single physical interface is redundant (at a minimum it should be duplicated).

The MAP functional interfacing technique is a request-response based protocol and demands that the high availability telecommunications system controls the requests, irrespective of the origin of the request. The fault detection and reporting procedures are also based on the high availability telecommunications system.

The key features of the MAP functional interfacing technique are:

the mirroring of the functions of the interface in terms of the requests and responses by the high availability telecommunications system, the asynchronous processing of the requests by the attached low availability computing platforms, discarding of the mirrored (redundant) response (a response may also be checked for accuracy) by the high availability telecommunications system, and, fault detection and reporting based on overdue (or inaccurate) response by the high availability telecommunications system.

The FIGURE illustrates a high availability telecommunications system interfacing to a minimum of two remote low availability computing platforms. Each platform is required to run a duplicate of the same application software and to have a minimum of two separate physical interfaces and interface controllers.

It is proposed that the telecommunications system controls the MAP functional interface protocol to the remote computing platforms and, in this example, shall:

1. send each "request" to both computing platform #P and its mirror computing platform #P' uniquely identifying each "request" with a MAP identifier,
2. forward the first identified "response" to the telecommunications system 'user' of the MAP interface and discard the mirrored "response"(if received),
2A. optionally, compare the first identified "response" with the mirrored "response".
3. detect failure of #P or #P' to respond within a timed period, by maintaining an image of "responses" due, and report that failure (so that repair may be instigated),
4. ensure periodically that a test procedure is run to ensure that all remote application computing platforms are capable of a response.

The low availability application computing platforms shall, in this example:

1. asynchronously process each "request",
2. correlate the "request" with the MAP identifier,
3. respond by including the MAP identifier in the appropriate "response".

What I claim is:

1. A high availability telecommunications system having means for mirroring functional interface requests, said means for mirroring comprising:

a) a system interface connected to said high availability telecommunications system and to a plurality of computing platforms remote from, and connected to, said interface;

b) all of the computing platforms being each individually operative for receiving and processing all of the functional requests, each said functional request being transmitted by said interface from said high availability telecommunications system to every one of said plurality of computing platforms and for responsively generating a response from every one of said plurality of computing platforms for receipt by said interface; and c) said interface being operative for identifying and selecting the response received first in time from the responses to said all of the functional requests transmitted by all of the computing platforms, and for forwarding the first received response to said high availability telecommunications system for system processing, and for discarding any further response.

2. The system as claimed in claim 1, wherein said interface transmits each functional request with a unique identifier for identifying the platform.

3. The system as claimed in claim 1, wherein said interface is operative for detecting failure of at least one of the computing platforms to generate its response within a predetermined time period.

4. The system as claimed in claim 1, wherein said interface is operative for comparing all the responses received from all the platforms to identify the first-received response.

5. The system as claimed in claim 1, wherein said interface is operative for testing periodically all the computing platforms to insure their operability to generate responses.

6. The system as claimed in claim 1, wherein each computing platform individually has a low availability.

7. The system as claimed in claim 1, wherein the system is part of an Intelligent Network.

\* \* \* \* \*